Dec. 20, 1955 G. E. LISENBY 2,727,582
DIFFERENTIALLY DRIVEN DUAL WHEELS WITH
LOCKING MEANS FOR THE DIFFERENTIAL
Filed Oct. 30, 1952 2 Sheets-Sheet 1

George Edward Lisenby
INVENTOR.

BY *Clarence A. O'Brien*
*and Harvey B. Jacobson*
Attorneys

Dec. 20, 1955    G. E. LISENBY    2,727,582
DIFFERENTIALLY DRIVEN DUAL WHEELS WITH
LOCKING MEANS FOR THE DIFFERENTIAL
Filed Oct. 30, 1952    2 Sheets-Sheet 2
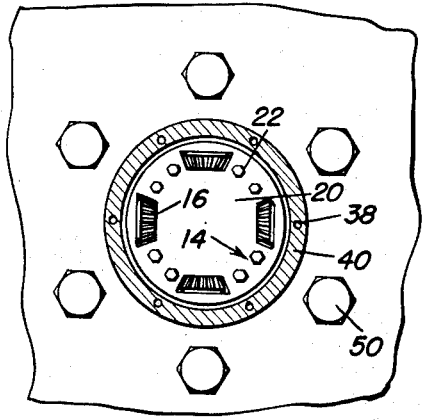
Fig. 2
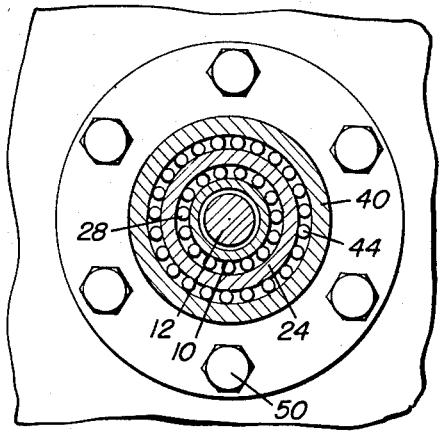
Fig. 3
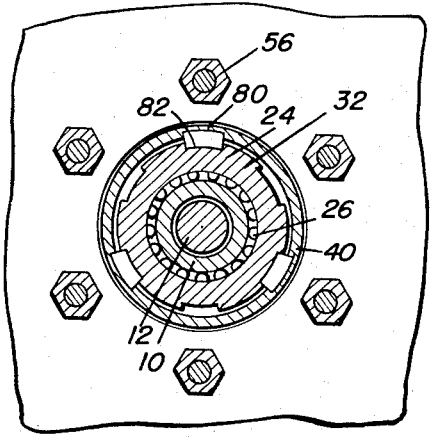
Fig. 4
Fig. 5
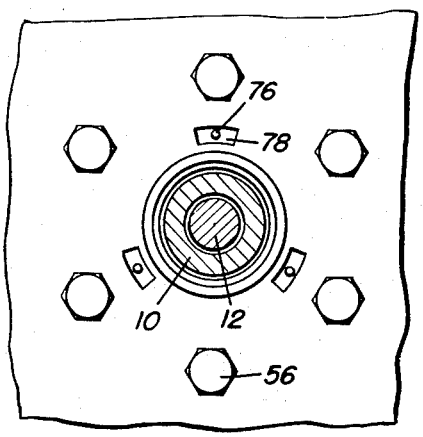
Fig. 6
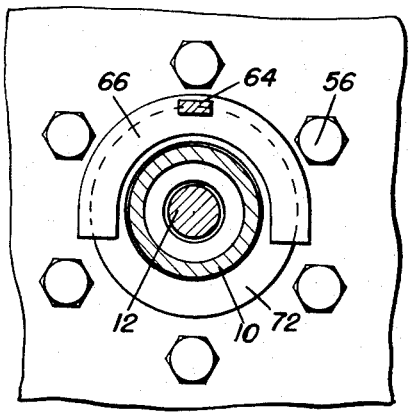
George Edward Lisenby
INVENTOR.

United States Patent Office 2,727,582
Patented Dec. 20, 1955

2,727,582

DIFFERENTIALLY DRIVEN DUAL WHEELS WITH LOCKING MEANS FOR THE DIFFERENTIAL

George Edward Lisenby, Woodstock, Ill.

Application October 30, 1952, Serial No. 317,757

4 Claims. (Cl. 180—22)

This invention relates to automotive vehicles and more particularly to a dual wheel assembly for use in trucks, omnibuses and the like.

The primary object of this invention is to provide a wheel assembly for automotive vehicles which include independently rotatably dual wheels so as to preserve the lives of the tires and assist in the turning of the vehicle on the road.

One of the more important features of this invention resides in the novel differential drive mechanism for the dual wheel assembly which is arranged to permit relative movement of the wheels in each assembly while transmitting a driving torque thereto from a single source of power, which differential drive mechanism may be selectively locked to enable the wheels to be driven together for common rotation when moving over uneven ground, snow or mud.

Still other objects of the invention reside in the provision of this dual wheel assembly that is simple in construction, capable of being readily mounted upon or removed from conventional axle structures of motor vehicles, strong, durable and relatively inexpensive to manufacture.

These, together with the various ancillary objects and features of the invention which will become apparent as the following description proceeds, are obtained by this dual wheel assembly, a preferred embodiment of which has been illustrated in the accompanying drawings, by way of example only, wherein:

Figure 2 is a sectional detail taken along the plane of line 2—2 in Figure 1;

Figure 3 is a sectional detail taken along the plane of line 3—3 in Figure 1;

Figure 4 is a sectional detail showing the construction of the splines as taken along the plane of line 4—4 in Figure 1;

Figure 5 is a sectional detail taken along the plane of line 5—5 in Figure 1;

Figure 6 is a sectional detail taken along the plane of line 6—6 in Figure 1 and showing the construction of the operating arm which operates the locking mechanism used in tying the wheels together for common movement;

Figure 1:
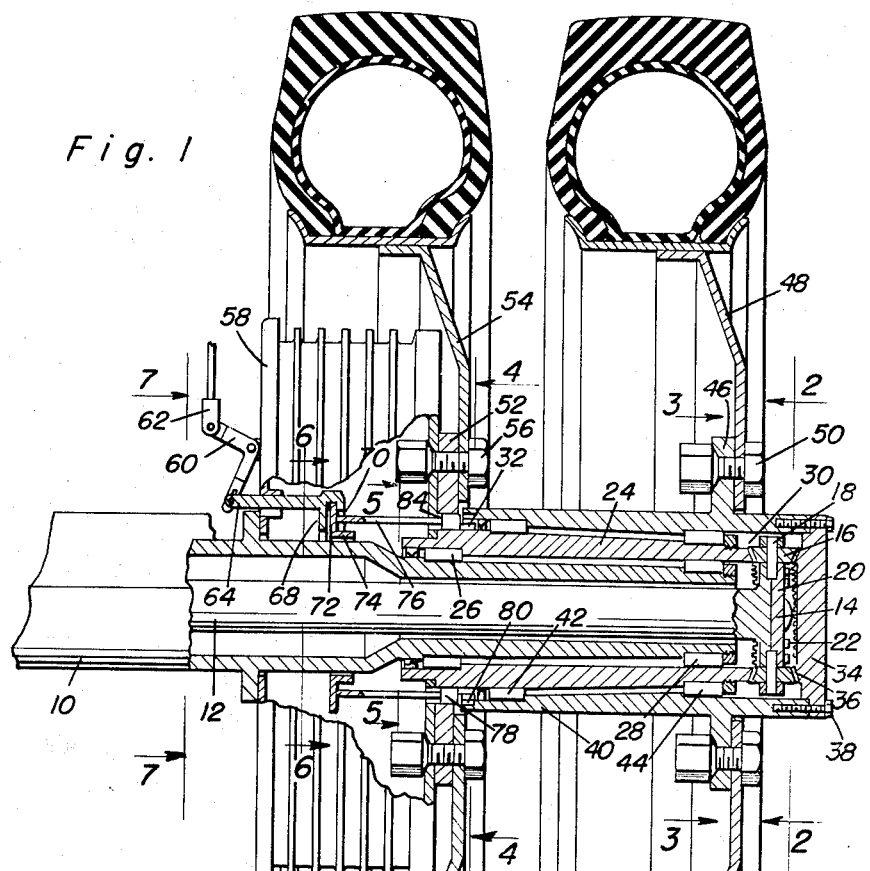
Figure 1 is a vertical sectional view showing the elements of the present invention in operative enplacement on an axle of an automotive vehicle.
Figure 7:
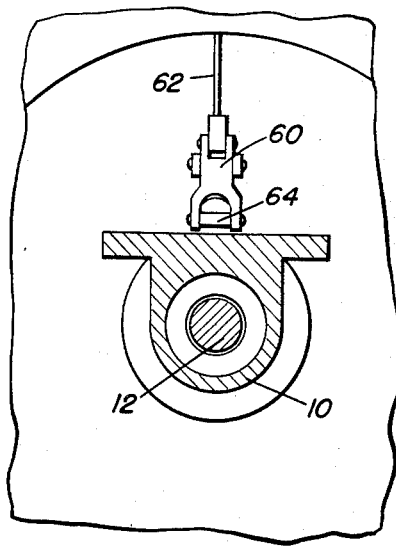
Figure 7 is a sectional view taken along the plane of line 7—7 in Figure 1 and showing the construction of the crank operating mechanism for the splines.

With continuing reference to the accompanying drawings wherein like reference numerals designate similar parts throughout the various views, reference numeral 10 generally designates a tubular axle housing which may be of conventional design. Fully rotatable within this housing 10 is an axle 12 which is formed with a spider gear assembly 14 at an end thereof. The spider gear assembly 14 includes beveled gears 16 which are suitably rotatably mounted and held in place by pins 18.

Ball bearings 20 and 22 are mounted on the end of the axle 12.

A tubular spindle 24 is journaled for relative movement about the axle housing 10 by means of sets of roller bearings 26 and 28. The sleeve 24 is provided with a bevel gear surface 30 which engages the spider gear assembly 14. Additionally, the spindle 24 has annular retaining elements 32 thereon for a purpose to be henceforth explained.

An end plate 34 which is provided with a bevel gear surface 36 engageable with the spider gear assembly 14 is secured by means of bolts 38 to a sleeve 40 journaled by means of roller bearing assemblies 42 and 44, for rotation relative to the spindle. The sleeve 40 is provided with an annular flange 46 to which a first wheel 48 may be suitably bolted as by fasteners 50. The spindle 24 has an annular flange 52 to which the wheel 54 is detachably secured by fasteners 56. A conventional brake assembly 58 is provided.

There is provided a pivotally mounted crank arm 60 having bifurcated end portions for reception of an operating lever 62 which may be connected for remote control of the apparatus. There is further connected to the crank 60 an operating arm 64 on which is formed an annular semi-circular arcuate member 66 substantially U-shaped in cross section having gripping fingers 68 and 70 adapted to engage the flange 72 attached to a ring 74. The ring 74 is positioned about the axle housing 10 and is adapted for sliding movement thereon. Attached to the flange 72 are spaced locking members 76 which have splined heads 78 at the free ends thereof. The sleeve 40 is provided with spaced inner annular recesses 80 which are adapted to cooperate with the spaces 82 between the retaining members 32 to form a slot for the reception of the spline heads 78. It is to be seen that the flange 52 is provided with apertures 84 through which the locking elements extend.

In operation, with the axle 12 rotating within its housing 10, the spider gear assembly 14 will actuate the spindle 24 to rotate the wheel 54. The spider gear assembly will further actuate the end plate 34 and hence the sleeve 40 to rotate the wheel 48. Hence, a differential transmission of power from the axle 12 to the wheels 48 and 54 is achieved. When it is desired to lock the wheels together for preventing relative movement therebetween, it is merely necessary to actuate the crank 60 by downwardly moving the lever 62 which will thus drive the operating arm 64 and the locking members 76 together with splined heads 78 into engagement within the recesses 80 and 82. This will lock the sleeve 40 and the spindle 24 preventing relative motion and providing a positive drive preventing relative movement of the wheels 48 and 54.

Since from the foregoing the construction and advantages of this dual wheel assembly are readily apparent and further description is believed to be unnecessary.

However, since numerous modifications will readily occur to those skilled in the art, it is not intended to limit this invention to the precise embodiment shown and described, but all suitable modifications and equivalents of this dual wheel assembly may be readily resorted to within the scope of the appended claims.

Having described the invention, what is claimed as new is:

1. A dual wheel assembly for vehicles comprising an axle, a spider gear assembly at one end of said axle, a tubular axle housing about said axle, a tubular spindle coaxial with said axle journaled on said housing, said spindle having a bevel gear surface at one end thereof engaging said spider gear assembly, an end plate having a bevel gear surface engaging said spider gear assembly, a sleeve secured to said end plate, said sleeve being journaled on said spindle, spaced recesses in said sleeve, retaining collar elements on said spindle having spaces therebetween, and spline means carried by said housing selectively locking said spindle with said sleeve, said recesses and the spaces between said retaining collar elements cooperating to form slots for reception of said splined means, said spline means including a crank, an operating arm pivotally secured to said crank, a ring slidably secured on said housing, splines secured to said ring, said operating arm engaging said ring moving said ring and said splines along the axis of said axle upon rotation of said crank.

2. A dual wheel assembly for vehicles comprising an axle, a spider gear assembly at one end of said axle, a tubular axle housing about said axle, a tubular spindle coaxial with said axle journaled on said housing, said spindle having a bevel gear surface at one end thereof engaging said spider gear assembly, an end plate having a bevel gear surface engaging said spider gear assembly, a sleeve secured to said end plate, said sleeve being journaled on said spindle, spaced recesses in said sleeve, retaining collar elements on said spindle having spaces therebetween, and spline means carried by said housing selectively locking said spindle with said sleeve, said recesses and the spaces between said retaining collar elements cooperating to form slots for reception of said splined means, said spline means including a crank, an operating arm pivotally secured to said crank, a ring slidably secured on said housing, said ring having an annular flange, splines secured to said annular flange, said operating arm having an arcuate member substantially U-shaped in section engaging said annular flange moving said ring and said splines along the axis of said axle upon rotation of said crank.

3. A dual wheel assembly for vehicles comprising an axle, a spider gear assembly at one end of said axle, a tubular axle housing about said axle, a tubular spindle coaxial with said axle journaled on said housing, said spindle having a bevel gear surface at one end thereof engaging said spider gear assembly, an end plate having a bevel gear surface engaging said spider gear assembly, a sleeve secured to said end plate, said sleeve being journaled on said spindle, spaced recesses in said sleeve, retaining collar elements on said spindle having spaces therebetween, and spline means carried by said housing selectively locking said spindle with said sleeve, said recesses and the spaces between said retaining collar elements cooperating to form slots for reception of said splined means, said spline means including a crank, an operating arm pivotally secured to said crank, a ring slidably secured on said housing, splines secured to said ring, said operating arm engaging said ring moving said ring and said splines along the axis of said axle upon rotation of said crank, a flange on said sleeve, a wheel secured to said flange on said sleeve, a flange on said spindle and a wheel secured to said flange on said spindle.

4. A dual wheel assembly for vehicles comprising an axle, a spider gear assembly at one end of said axle, a tubular axle housing about said axle, a tubular spindle coaxial with said axle journaled on said housing, said spindle having a bevel gear surface at one end thereof engaging said spider gear assembly, an end plate having a bevel gear surface engaging said spider gear assembly, a sleeve secured to said end plate, said sleeve being journaled on said spindle, spaced recesses in said sleeve, retaining collar elements on said spindle having spaces therebetween, and spline means carried by said housing selectively locking said spindle with said sleeve, said recesses and the spaces between said retaining collar elements cooperating to form slots for reception of said splined means, said spline means including a crank, an operating arm pivotally secured to said crank, a ring slidably secured on said housing, said ring having an annular flange, splines secured to said annular flange, said operating arm having an arcuate member substantially U-shaped in section engaging said annular flange moving said ring and said splines along the axis of said axle upon rotation of said crank, a flange on said sleeve, a wheel secured to said flange on said sleeve, a flange on said spindle and a wheel secured to said flange on said spindle.

References Cited in the file of this patent

UNITED STATES PATENTS

| | | |
|---|---|---|
| 1,511,908 | Pickering | Oct. 14, 1924 |
| 1,959,147 | Angell | May 15, 1934 |
| 2,267,362 | Ash | Dec. 23, 1941 |
| 2,306,856 | Ash | Dec. 29, 1942 |
| 2,389,339 | Ash | Nov. 20, 1945 |
| 2,620,235 | Butler | Dec. 2, 1952 |

FOREIGN PATENTS

| | | |
|---|---|---|
| 466,062 | Germany | Oct. 1, 1928 |
| 24,978 1905 | Great Britain | Oct. 11, 1906 |
| 451,338 | Italy | Mar. 19, 1949 |